United States Patent
Venkatasubramanian et al.

(10) Patent No.: US 11,481,734 B2
(45) Date of Patent: Oct. 25, 2022

(54) MACHINE LEARNING MODEL FOR PREDICTING LITIGATION RISK ON CONSTRUCTION AND ENGINEERING PROJECTS

(71) Applicant: ORACLE INTERNATIONAL CORPORATION, Redwood Shores, CA (US)

(72) Inventors: Karthik Venkatasubramanian, Melbourne (AU); Chathuranga Widanapathirana, Melbourne (AU); Ria Nag, Kolkata (IN); Padmakumar A. Nambiar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/018,297

(22) Filed: Sep. 11, 2020

(65) Prior Publication Data

US 2021/0081899 A1   Mar. 18, 2021

Related U.S. Application Data

(60) Provisional application No. 62/900,086, filed on Sep. 13, 2019.

(51) Int. Cl.
*G06Q 10/10* (2012.01)
*G06F 17/18* (2006.01)
(Continued)

(52) U.S. Cl.
CPC .......... *G06Q 10/107* (2013.01); *G06F 17/18* (2013.01); *G06K 9/6267* (2013.01); *G06N 20/00* (2019.01)

(58) Field of Classification Search
CPC ...... G06Q 10/107; G06N 20/00; G06N 20/10; G06F 17/18; G06K 9/6267
See application file for complete search history.

(56) References Cited

U.S. PATENT DOCUMENTS 8,620,842 B1 * 12/2013 Cormack ............... G06N 20/00
706/12
9,552,548 B1 * 1/2017 Brestoff ................. G06N 20/00
(Continued)

OTHER PUBLICATIONS

Selivanov et al., Package 'TEXT2VEC', pp. 1-11, published Feb. 18, 2020; downloaded from: http://text2vec.org.
(Continued)

*Primary Examiner* — Nam T Tran
(74) *Attorney, Agent, or Firm* — Kraguljac Law Group, LLC

(57) ABSTRACT

Systems, methods, and other embodiments associated with a machine learning system that monitors and detects risk in electronic correspondence related to a construction project are described. In one embodiment, a method includes monitoring email communications over a network to identify an email; tokenizing text from the email into a plurality of words and initiating a machine learning classifier configured to identify construction terminology and to classify text with a risk as being litigious or non-litigious. The machine learning classifier processes the words from the email by at least corresponding the words to a set of defined litigious vocabulary and defined non-litigious vocabulary. The email is labeled as litigious or non-litigious. An electronic notice is generated and transmitted to a remote device in response to the email being labeled as being litigious to provide an alert in near-real time in relation to receiving the email over the network.

18 Claims, 5 Drawing Sheets

(51) Int. Cl.
*G06K 9/62* (2022.01)
*G06N 20/00* (2019.01)

(56) References Cited

U.S. PATENT DOCUMENTS

| | | | |
|---|---|---|---|
| 10,095,992 B1 | 10/2018 | Brestoff et al. | |
| 2005/0209897 A1* | 9/2005 | Luhr | G06Q 40/00 705/7.28 |
| 2014/0337269 A1* | 11/2014 | Eads | G06N 20/00 706/46 |
| 2018/0144421 A1 | 5/2018 | Williams et al. | |
| 2019/0019061 A1* | 1/2019 | Trenholm | G06N 20/00 |
| 2019/0213498 A1 | 7/2019 | Adjaoute | |
| 2020/0074242 A1 | 3/2020 | Chen et al. | |

OTHER PUBLICATIONS

Alozn et al; Can Machines Replace the Human Brain? A Review of Litigation Outcome Prediction Methods for Construction Disputes; pp. 1-8; Construction Law Intl. Conference, Mar. 2015.

Ullman; Stanford; Data Mining (Chapter 1) pp. 1-19; downloaded from: http://i.stanford.edu/~ullman/mmds/ch1.pdf.

Stacy Sinclair; Fenwick Elliott; AI and Contruction Law: an Essential and Inevitable Partnership; Part 2: Dispute Resolution and Predicting Dispute Outcomes; pp. 2-4; downloaded from: https://www.fenwickelliott.com/research-insight/newsletters/international-quarterly/ai-construction-law-2.

Bigham et al., (2019) Artificial Intelligence for Construction Safety: Mitigation of the Risk of Fall. In: Arai K., Kapoor S., Bhatia R. (eds) Intelligent Systems and Applications. IntelliSys 2018. Advances in Intelligent Systems and Computing, vol. 869. Springer, Cham. https://doi.org/10.1007/978-3-030-01057-7_76.

Arditi et al., Predicting the Outcome of Construction Litigation Using Boosted Decision Trees; Journal of Computing in Civil Engineering / vol. 19, Issue 4—Oct. 2005, pp. 1-7.

Mahfouz et al., Litigation Outcome Prediction of Differing Site Condition Disputes Through Machine Learning Models; Journal of Computing in Civil Engineering / vol. 26, Issue 3, May 2012; pp. 1-11.

Kakhki et al., Evaluating Machine Learning Performance in Predicting Injury Severity in Agribusiness Industries; ScienceDirect; Safety Science 117 (2019) pp. 257-262; downloaded on Oct. 21, 2021 from: https://www.sciencedirect.com/science/article/pii/S092575351831107X.

Python Software Foundation; Python Framework for Fast Vector Space Modelling; gensim 4.1.2—pip install gensim; pp. 1-4; released Sep. 16, 2021.

Scikit-Learn Developers (BSD License); sklearn.linear_model. LogisticRegressionCV; pp. 1-6; 2207-2021; downloaded on Oct. 21, 2021 from: https://scikit-learn.org/stable/modules/generated/sklearn.linear_model.LogisticRegressionCV.html.

Tianqi Chen et al., Package 'xgboosf';—Title: Extreme Gradient Boosting; version 1.4.1.1; Apr. 22, 2021; pp. 1-65; downloaded Oct. 21, 2021 from: https://cran.r-project.org/web/packages/xgboost/xgboost.pdf.

Akinosho et al.; Deep Learning in the Construction Industry; A review of Present Status and Future Innovations; Journal of Building Engineering, vol. 32; Nov. 2020, 101827; pp. 1-14; downloaded on Oct. 21, 2021 from: https://www.sciencedirect.com/science/article/pii/S2352710220334604#bib54.

Zhang et al.; A C-BiLSTM Approach to Classify Construction Accident Reports; pp. 1-16; published Aug. 20, 2020; Licensee MDPI, Basel, Switzerland; downloaded on Oct. 21, 2021 from: https://www.mdpi.com/2076-3417/10/17/5754/pdf.

Tixier et al., Application of Machine Learning to Construction Injury Prediction; pp. 1-27; Jun. 2016, www.sciencedirect.com.

* cited by examiner

MACHINE LEARNING MODEL FOR PREDICTING LITIGATION RISK ON CONSTRUCTION AND ENGINEERING PROJECTS

CROSS REFERENCE TO RELATED APPLICATIONS

This disclosure claims the benefit of U.S. Provisional Patent Application Ser. No. 62/900,086filed Sep. 13, 2019, titled "Transforming Construction and Engineering Systems With Technology and Data Insights", by Venkatasubramanian, and assigned to the present assignee, which is incorporated by reference herein in its entirety.

BACKGROUND

Disputes and litigations are a common occurrence in most large-scale construction and engineering projects. These disputes and litigations cost owners, contractors, sub-contractors, architects, and consultants millions of dollars in damages impacting the overall project. Early detection of potential issues that could lead to disputes and litigations enable proactive interventions.

For example, digital platforms are used to manage and communicate day-to-day electronic correspondences over the course of a project. These electronic correspondences contain information that if deciphered correctly could indicate early signs of potential issues that could lead to larger disputes or litigations. These early signs can be used to identify dispute and litigation risks associated with each project and can serve to provide early warnings.

However, no prior system exists that is a computer intelligent system for identifying such early signs or risks for a project. Also, there is no prior system that can forecast or predict a potential risk for a project based on electronic correspondence.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that implement an artificial intelligence (AI) based monitoring and detection system. In one embodiment, a machine learning model is configured to monitor network communications and predict litigation risk in electronic correspondences exchanged that relate to construction and engineering projects. For example, the system and method identify litigation risks using an application-specific artificial intelligence configured for semantic natural language understanding, created, trained and optimized specifically for litigation issue detection in text from construction and engineering project correspondence.

In one embodiment, the present system monitors (e.g., in near real-time) network communications and electronic correspondence in an ongoing project or a collection of projects in an organization's portfolio. Information in the electronic correspondence is deciphered with the machine learning model to identify and detect language indicating risk of litigation. The machine learning model makes a prediction whether the language amounts to a threshold level of risk based on at least a set of trained data. When the risk is predicted for a correspondence, the system automatically generates an alert in near-real time and labels the associated correspondence threads as litigious. This may include labeling an email thread if there is a litigation risk associated with the last correspondence sent in a single thread.

In one embodiment, the system may combine the identified correspondence with contextual project metadata to associate the predicted risk with a project process. Information about the identified correspondence and the identified project may then be transmitted and/or presented on a graphical user interface and/or transmitted in an electronic message to a remote computer for a user to have access to the information in near real-time. In another embodiment, the present system provides a feed-back process were the user can change the labels associated with each communication thread in case the prediction by the system is incorrect as judged based on the user's experience and intuition. The changed label is then fed back to the present system model as new training data to improve the prediction accuracy over time.

Figure 1:
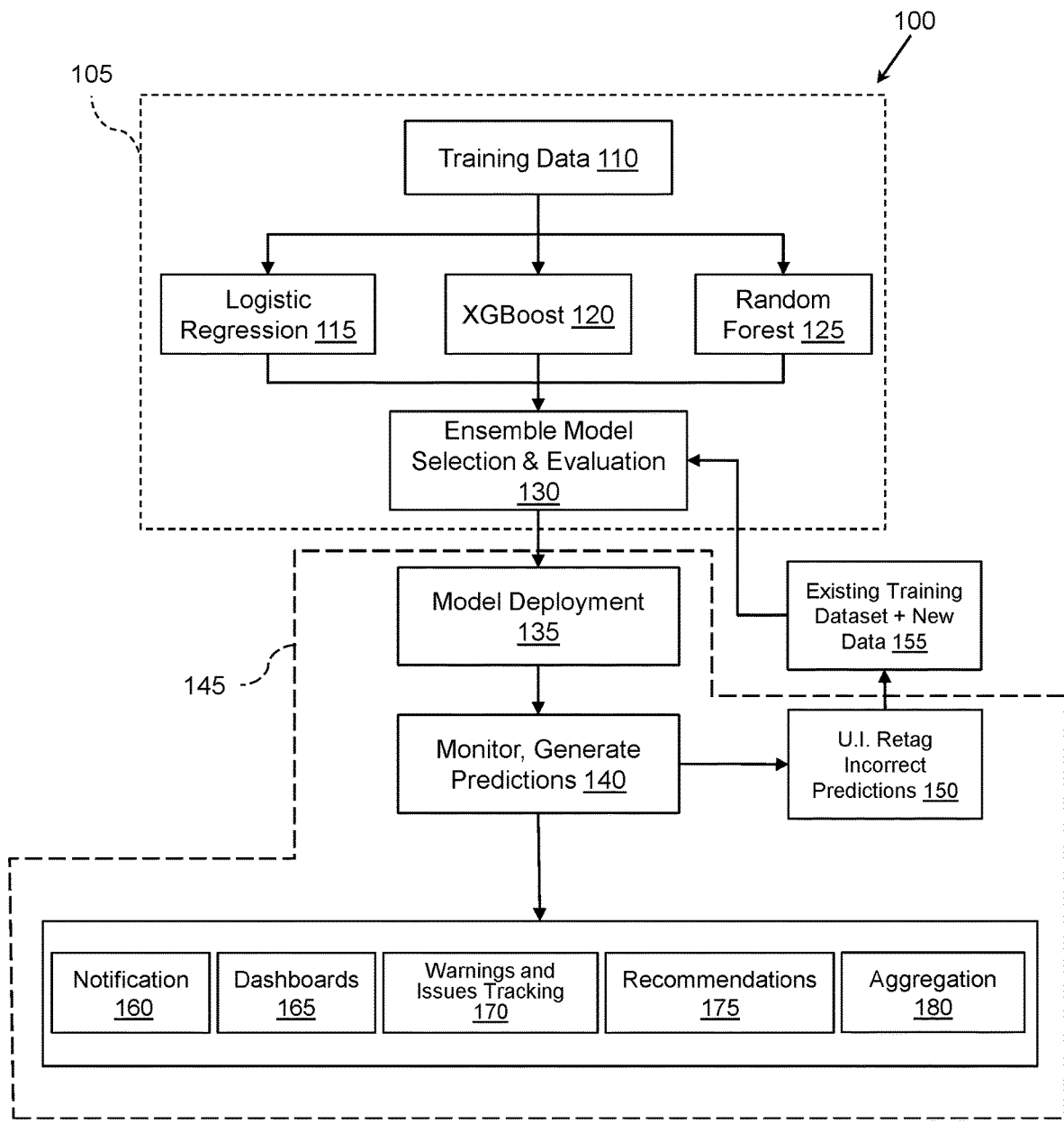
FIG. 1 illustrates one embodiment of a machine learning system associated with predicting risk from electronic correspondence.

With reference to FIG. 1, one embodiment of a risk detection system 100 is illustrated that is configured to monitor network communications and predict litigation risk in electronic correspondences. Initially, the system 100 includes training a machine learning model (described below) with a known dataset of project correspondence including known litigious language and known non-litigious language. The training configures the machine learning model to identify and predict legal risks associated with a particular project based on electronic correspondence that is monitored. In one embodiment, after the model is deployed and operating to monitor communications, any identified legal risks are categorized based on a likelihood the identified risk will result in a dispute or a litigation. The identified risks and associated correspondence may be presented and displayed for validation to allow correction of any incorrect predictions. Any corrected predictions are then fed back into the machine learning model to learn from the corrected predictions. This allows the system to evolve over time to identify legal risks specific to a particular construction project. A more detailed explanation follows.

Training Phase

With reference to FIG. 1, components of an initial training phase are shown within the dashed line 105. In one embodiment, training data 110 is input to the machine learning model, which includes multiple, independently operating, base machine learning classifiers/algorithms. Each classifier generates an output that classifies a correspondence that is evaluated and all the outputs are combined in to create an ensemble majority voting classifier 130.

In FIG. 1, the risk detection system 100 includes an odd number (three) base machine learning classifiers/algorithms 115, 120, and 125. In one embodiment, each base classifier is selected based on operating from a different theoretical background from the other classifiers to avoid bias and redundancy. For example, the three classifiers shown include (1) a logistic regression classifier 115 with L1 regularization, which is a parametric classifier; (2) a gradient boosting classifier XGBoost 120, which uses the Gradient Boosting framework; (3) a random forest classifier 125, which is an ensemble learning method that operates by constructing a multitude of decision trees and implements machine learning algorithms under the bootstrap aggregation framework.

The training data 110 is input to each of the machine learning classifiers 115, 120, and 125. For example, the training data includes a known dataset of construction project correspondence including known litigious language and known non-litigious language.

Structure of the Classification Problem

It is observed a number of observation's pairs $(x_i, y_i)$ $i=1, \ldots, n$ where $x \in X \subset \mathbb{R}^p$ and $y \in Y = \{$Litigious correspondence, not litigious correspondences$\}$. X is a predictor space (or attributes) and Y is a response space (or class).

In this case, the number of attributes is the features of the vectors obtained upon vectorization of each correspondence thread text. In one embodiment, a pre-trained vectorization model uses text2vec library for text vectorization, topic modeling, word embeddings, and similarities. The first step is to vectorize text using vocabulary based vectorization. Here unique terms are collected from a group of input documents (e.g., groups of email correspondence and threads) and each term is marked with a unique ID. Then the risk detection system 100 creates a vocabulary based document term matrix (DTM) using the pre-trained vectorization model in text2vec. This process transforms each correspondence thread into a numerical representation in the vector space. This process transforms text into a numerical representation (an embedding) of the text's semantic meaning. If two words or documents have a similar embedding, they are semantically similar. Thus using the numerical representation, the risk detection system 100 is capable of capturing the context of a word in a document, semantic and syntactic similarity, relation with other words, etc.

The entire dataset is transformed into an m×n matrix with m being the number of correspondence threads and n is the total number of features in the vector space. Each correspondence thread is represented by a vector of n dimensions:
Table 1—Document Term Matrix:

TABLE 1

Document Term Matrix

|  | T1 | T2 | T3 | T4 | T5 | T6 | T7 | T8 |
|---|---|---|---|---|---|---|---|---|
| Doc1 | 2 | 0 | 4 | 3 | 0 | 1 | 0 | 2 |
| Doc2 | 0 | 2 | 4 | 0 | 2 | 3 | 0 | 0 |
| Doc3 | 4 | 0 | 1 | 3 | 0 | 1 | 0 | 1 |
| Doc4 | 0 | 1 | 0 | 2 | 0 | 0 | 1 | 0 |
| Doc5 | 0 | 0 | 2 | 0 | 0 | 4 | 0 | 0 |
| Doc6 | 1 | 1 | 0 | 2 | 0 | 1 | 1 | 3 |
| Doc7 | 2 | 1 | 3 | 4 | 0 | 2 | 0 | 2 |

Figure 2:
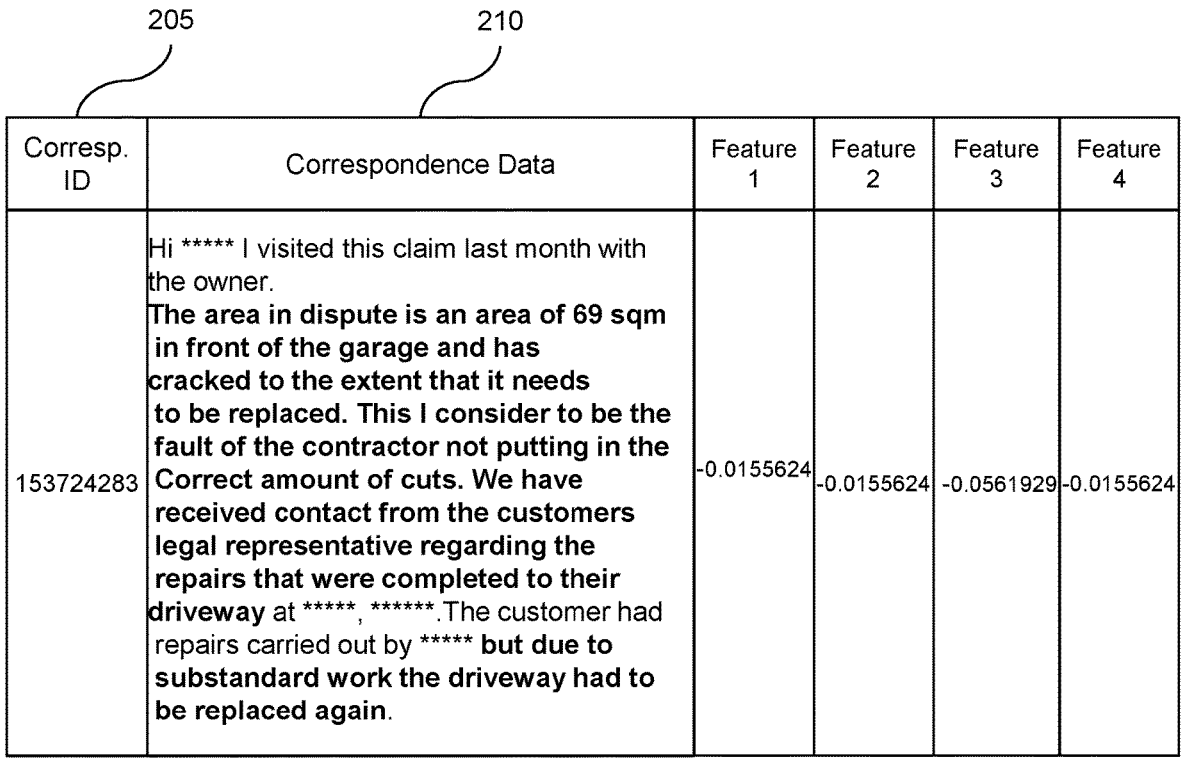
FIG. 2 illustrates one embodiment of a document term matrix in R for a single correspondence thread with 4 features.

With reference to FIG. 2, an example of a document term matrix in R for a single correspondence thread with four (4) features is shown. A correspondence ID 205 is assigned to each particular correspondence thread (data 210). The four (4) example features are listed as Feature 1; Feature 2; Feature 3; and Feature 4. Here each feature in vector space is a feature from the correspondence generated by the pre-trained vectorization model. The generic terms "Feature 1," "Feature 2," etc. are used for simplicity and for discussion purposes only. The labels for each of these features (e.g., "yxnhwauaggd", "neapbbuzu") as shown in FIG. 2 are also generated by the model and do not have any physical significance in this discussion. The labels can instead be represented as other types of strings based on how the model is configured to generate such labels.

The objective is to use these observations in order to estimate the relationship between X and Y, thus predict X from Y. The relationship is denoted as a classification rule, $$h_j(X) = \arg\max P(y|X,\theta_j), j=1, \ldots, 3 \quad \text{(Equation 1)}$$

where $P(.,.)$ is the probability distribution of the observed pairs, $\Theta$ is the parameter vector for each base classifier, and j is the number of the base classifiers. Since the risk detection system 100 implementation has three base classifiers 115, 120, and 125, there are three classification rules, one for each base classifier, hence j=3.

In FIG. 2, under the columns of Features 1-4, numbers −0.0155624, −0.0561929, etc. are shown. These numbers represent example values of each feature in a document vector (vectorized representation of each document).

Data Preparation

A labeled dataset of about 1,129 unique records of correspondence threads was created with about 550 sample correspondences having known litigious text and about 583 sample correspondences having known non-litigious correspondences. Of course, different amounts of data records may be used. In addition to having known litigious text and known non-litigious text, the correspondence from the dataset may include known construction and/or engineering vocabulary and terminology. For example, the construction terminology can be collected and input from an existing glossary or database of construction project terms. This allows the machine learning models to learn and identify whether a received email correspondence relates to a construction project or is unrelated to a construction project. This feature may be useful when the present system operates on a general email system that includes non-construction correspondence that should be filtered out to avoid unnecessary classification and use of computing resources (e.g., avoid using the machine classifiers, avoid processor time, memory, etc.).

The correspondence text from each record is cleaned by removal of stop words, punctuations, numbers and HTML tags. Remaining words are stemmed to their root word with all lowercase characters.

A vocabulary was created from 600 correspondence threads of which 300 have known litigious vocabulary and 300 correspondence threads have known non-litigious vocabulary that contained the same ratio of litigious and non-litigious samples. Each of the 1129 correspondence threads was then vectorized to create a document term matrix (see Table 1) using the library text2vec, in which each row represents a unique correspondence thread and each column represents a feature in the vector space.

In one embodiment, each feature was normalized to its mean value of 0 and a standard deviation of 1. The dataset was split into 90% for training and 10% for testing. The ratio of litigious versus non-litigious correspondences was the same (or nearly the same) in both the test and the training dataset. The training dataset was fed as an input to the below-mentioned machine learning models. After the regularization of the models, a prediction was made on the test dataset as well as a dataset of previously unseen records (e.g., 10,000 previously unseen records with unknown text). 3000 records predicted as non-litigious by all three of the models were added back to the initial 1129 records as a co-training dataset to increase the size of the labeled train and test dataset for building the models.

With continued reference to FIG. 1, the following includes descriptions of the machine learning algorithms for each of the machine learning models: logistic regression 115, XGBoost 120, and Random forest 125.

1. Logistic Regression Model 115 with L1 Regularization

Input for the model 115 is the scaled document term matrix as described above [Table 1 and FIG. 2]. A penalized logistic regression model 115 with L1 regularization was built which imposes a penalty to the logistic model for having too many variables. The coefficients of some less contributive variables are forced to be exactly zero in Lasso Regression. In one embodiment, only the most significant variables are kept in the final model.

A convergence threshold for coordinate descent was set at 1e-1 and a maximum number of passes over the data for all lambda values was taken as 1e3.

Figure 3:
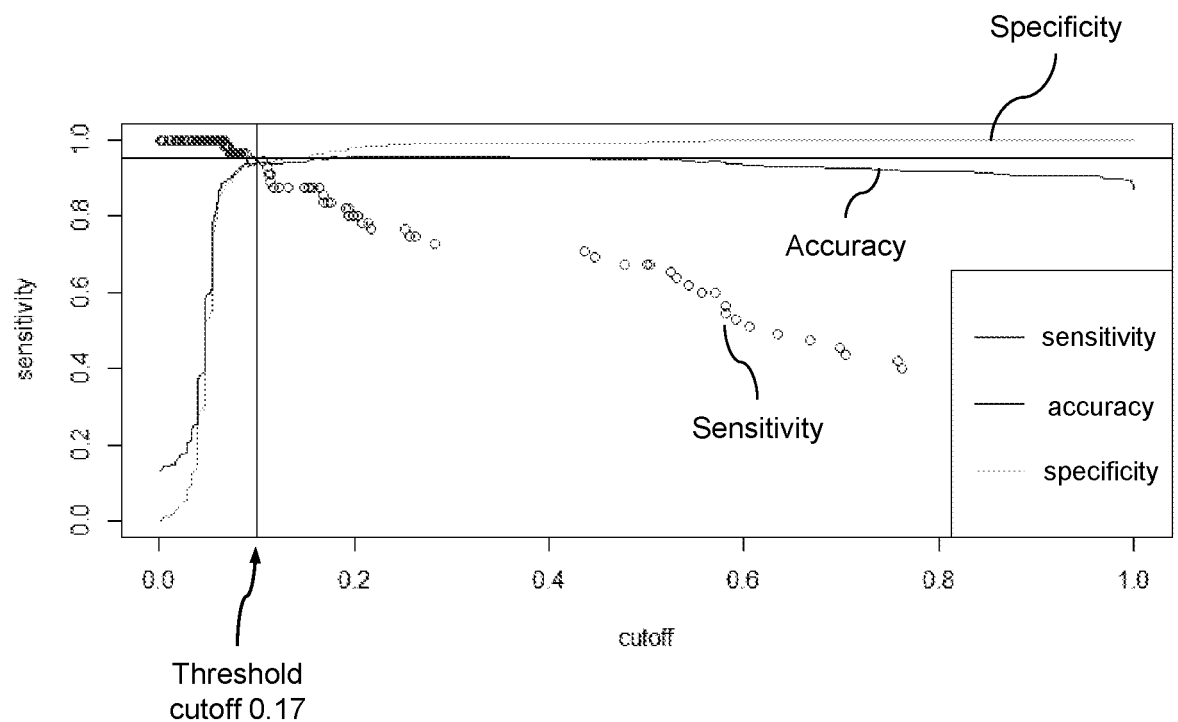
FIG. 3 illustrates one embodiment of a graph showing sensitivity, specificity, and accuracy versus probability of litigation risk cutoff value for choosing an initial threshold.

The output of the logistic regression model 115 is a probability value of a correspondence thread to be litigious. An initial threshold for the probability value of the correspondence thread to be litigious was taken to be any value above 0.17. The initial threshold was chosen to be the cutoff value for probability where the sensitivity, specificity, and accuracy are very close to each other using a grid search (see FIG. 3 showing Sensitivity, Specificity, Accuracy versus probability of litigation risk cutoff value graph). It was then slightly modified according to model performance across unseen datasets.

Model evaluation: A 4-fold cross-validation was performed with a logistic regression model. The "AUC" under "ROC curve" was taken as an evaluation metric. AUC is an "Area Under the ROC Curve." The AUC measures the entire two-dimensional area underneath the entire ROC curve from (0,0) to (1,1). The ROC curve stands for "Receiver Operating Characteristic" curve and is a graph showing the performance of a classification model at all classification thresholds. The ROC curve plots two parameters: True Positive Rate (TPR) and False Positive Rate (FPR), where the curve plots TPR vs. FPR at different classification thresholds.

TABLE 2

Confusion Matrix and Statistics for the test dataset

| Prediction | Reference No | Yes |
|---|---|---|
| No | 350 | 10 |
| Yes | 8 | 45 |

From the evaluation of the logistic regression model 115, the following values were observed:
Accuracy: 0.95 Sensitivity: 0.98 Specificity: 0.82
KS statistics: 0.89 and within 4th decile
AUC under ROC: 0.98

KS statistics are determined from a KS (Kolmogorov-Smirnov) chart that measures performance of classification models. For example, KS is a measure of the degree of separation between positive and negative distributions. The KS is 100 if the scores partition the population into two separate groups in which one group contains all the positives and the other all the negatives.

Conversely, if the model cannot differentiate between positives and negatives, then the model is viewed as selecting cases randomly from the population. The KS would then be 0. In most classification models the KS will fall between 0 and 100, and that the higher the value, the better the model is at separating the positive from negative cases.

2. Gradient Boosting Algorithm Ensemble Algorithm Using XGboost

Input for the XGBoost model 120 is the scaled document term matrix as described above in Table 1. XGBoost is an optimized distributed gradient boosting library designed to be highly efficient, flexible and portable. It implements machine learning algorithms under the Gradient Boosting framework. In the XGBoost model 120, it is implemented with a gradient boosting tree algorithm. The input matrix is the same document term matrix as referred to above.

In tree-based ensemble methods, such as XGBoost or Random Forest, each feature is evaluated as a potential splitting feature, which makes them robust to unimportant/irrelevant variables, because such variables that cannot discriminate between events/non-events will not be selected as the splitting variable and hence will be very low on the variable importance graph as well.

The following parameter values were selected for hyperparameter tuning for regularization with 5-fold cross-validation after a grid search over a range of values:
eta=0.2,
gamma=6,
max_depth=3,
min_child_weight=1,
subsample=0.5,
colsample_bytree=0.5
nrounds=92

The "AUC" under the "ROC curve" was used as the evaluation metric. The output of the XGBoost model 120 is a probability value of the correspondence thread to be litigious. The threshold for the probability value of the correspondence thread to be litigious was taken to be any value above 0.5. The initial threshold was chosen to be the cutoff value for probability where the sensitivity, specificity, and accuracy are very close to each other using a grid search. It was then slightly modified according to model performance across unseen datasets.

Model Evaluation: Confusion Matrix and Statistics for the Test Dataset:

TABLE 3

XGBoost

| Prediction | Reference No | Yes |
|---|---|---|
| No | 353 | 6 |
| Yes | 5 | 49 |

From the evaluation, the following values were observed:
Accuracy: 0.96 Sensitivity: 0.81 Specificity: 0.99
KS statistics: 0.94 and within 4th decile
AUC under ROC: 0.99

3. Random Forest Classifier 125

The input for the random forest classifier model 125 is the scaled document term matrix as described above in Table 1.

In one embodiment, the random forest classifier 125 is built with four (4) variables available for splitting at each tree node selected through a grid search over a range of values.

The "AUC" under the "ROC curve" was taken as the evaluation metric, and the number of trees was taken as 500.

Output of the random forest classifier model 125 is the probability value of a correspondence thread to be litigious. The threshold for the probability value of the correspondence thread to be litigious was taken to be any value above 0.074. The threshold value was chosen based on model performance across unseen datasets in the same way as was done for the logistic regression model 115.

Model evaluation: Confusion Matrix and Statistics on the test dataset for Random Forest Classifier 125.

TABLE 4

| Prediction | Reference No | Yes |
|---|---|---|
| No | 331 | 6 |
| Yes | 27 | 49 |

From the evaluation, the following values were observed:
Accuracy: 0.92 Sensitivity: 0.89 Specificity: 0.92
KS statistics: 0.84 and within 4th decile
AUC under ROC: 0.97
Ensemble Majority Voting Classification With continued reference to FIG. 1, each of the three base classifiers 115, 120, and 125 is an expert in a different region of the predictor space because each classifier treats the attribute space under different theoretical basis. The risk detection system 100 combines output of the three classifiers 115, 120, and 125 in such a way to produce an ensemble majority voting classifier 130 that is superior to any of the individual classifiers and their rules. Thus with an odd number of three classifiers, a majority vote/prediction for a final result would need at least two classifiers to vote/predict the same result (e.g., either predict "litigious" or "non-litigious" for a correspondence).

In one embodiment, given the random forest model's 125 generalization ability, its prediction was given double the weight compared to XGBoost 120 and logistic regression classifier 115 in the ensemble model 130. In other embodiments, each classifier's prediction may be given equal weight.

In operations, as an electronic correspondence (e.g., mail thread) is evaluated by each model 115, 120, 125, the output of each model is a probability of the mail thread being litigious. Based on the probability compared to a threshold value, a label is assigned for each mail thread. For example, the label is "1" if the probability of a mail thread being litigious as predicted by the model is greater than the threshold. The label is "0" if the probability of a mail thread being litigious as predicted by the model is less than the threshold. Consequently, the label is "0" if the mail thread is of a non-litigious nature.

Of course, other labels may be used to indicate litigious or non-litigious. In one embodiment, using ones "1" and zeros "0" as the labels allows the labels to be used as votes, which may then be combined from multiple machine learning classifiers to create a majority voting scheme of the ensemble model 130 as described below.

In one embodiment, the risk detection system 100 uses the following equation to combine the outputs from the three base classifiers into the ensemble model 130:

$$C(X) = 2*h1(X) + h2(X) + h3(X) \quad \text{(Equation 2)}$$

Here $C(X)$ is the sum of the weighted output of the three individual classifiers with $h1(X)$, $h2(X)$ and $h3(X)$ being the output of the random forest 125, XGBoost gradient boosting 120, and the logistic regression classifier 115, respectively. Here C, h1, h2, and h3 are all functions of X, which represents the features or attributes identified from an electronic correspondence being evaluated. The output (prediction or vote) from the random forest h1 is given double weight with a multiplier of "2."

In one embodiment, the system 100 classifies an electronic correspondence as litigious if $C(X) \geq 2$. If $C(X) < 2$, the correspondence is classified as non-litigious. Thus, the ensemble model predicts a correspondence to be litigious if any two of the three base classifiers or only the random forest classifier classifies the correspondence as litigious.

TABLE 5

Ensemble Model 130 evaluation: Confusion Matrix and Statistics for the test dataset

| Prediction | Reference No | Yes |
|---|---|---|
| No | 332 | 5 |
| Yes | 27 | 50 |

From the evaluation, the following values were observed:
Accuracy: 0.92 Sensitivity: 0.90 Specificity: 0.92
Model Deployment—Operation/Execution Phase With continued reference to FIG. 1, in one embodiment, once the ensemble model 130 is configured and trained, the ensemble model 130 is deployed (block 135) for operation. During operation, correspondence is monitored and evaluated (block 140, also FIG. 4) in near-real time for having litigious and non-litigious content. The ensemble model 130 generates risk predictions for each correspondence based on its text as explained above and generates an associated label as litigious or non-litigious. Components of the deployed model are shown in dashed line 145.

When the ensemble model 130 determines and predicts that a correspondence is a litigious risk, an electronic notification (block 160) is generated via the graphical user interface (block 140). The deployment and operation of the ensemble model is further described with reference to FIG. 4.

In one embodiment, the ensemble model 130 may be configured to provide a number of additional features that are generated and presented in a graphical user interface. These features may include dashboards 165, warnings and issues tracking 179, recommendations 175 and/or aggregation 180.

For example, dashboards (block 165) may be generated to graphically represent one or more types of results and/or summary data from the ensemble model 130. For example, a summary may include a number of litigious emails exchanged in a project visible to a particular organization/individual with the project within a specific interval of time. Other types of summary reports/information regarding the correspondences analyzed, statistics, and/or data analysis reports may be included in the dashboards 165 as graphical information. The display may also include whether each of the emails or correspondences displayed on the dashboard 165 has litigious content or not.

Warnings and issues tracking (block 170): In one embodiment, the system 100 highlights the topics and keywords that potentially point to the reason why the emails or correspondences have potential litigious content as identified by the machine learning models. The warnings and issues tracking 170 may also be combined with recommendations 175.

Recommendations (block 175): In one embodiment, the system 100 may categorize a project as a high, medium or low risk category depending on a number of litigious emails exchanged in a project visible to a particular organization/individual with the project within a specific interval of time. This will enable a concerned person to take appropriate measures as soon as possible.

Aggregation (block 180): In one embodiment, the system 100 may determine a percentage of litigious mails among all mails exchanged in a project visible to a particular organization/individual with the project within a specific interval of time.

Figure 4:
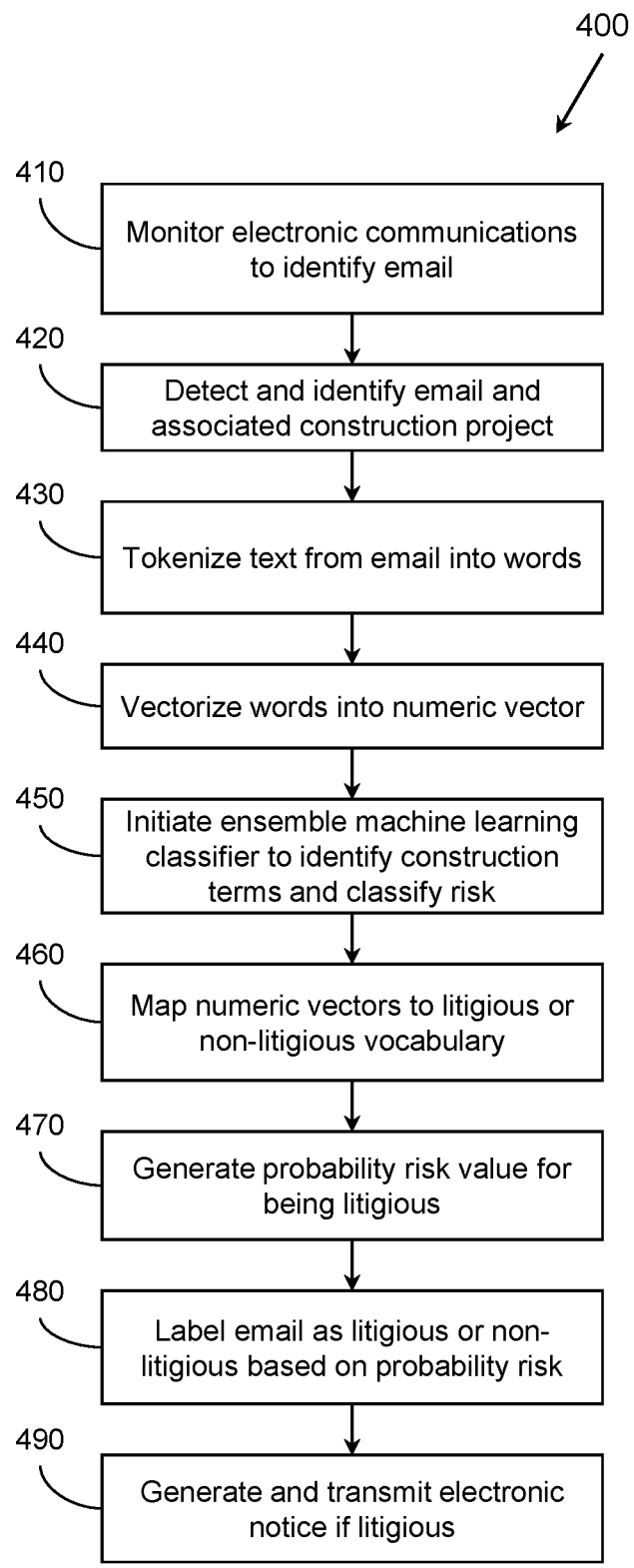
FIG. 4 illustrates an embodiment of a method associated with detecting potential risks from electronic communications of construction projects.

With reference to FIG. 4, one embodiment of a method 400 is illustrated that describes the operation of the ensemble model 130 during deployment and execution. As previously stated, the ensemble model 130 is configured to monitor electronic correspondence and detect litigation risk from the electronic correspondence that is associated with a construction or engineering project. In one embodiment, the ensemble model 130 is configured as part of a selected computing platform and/or email network that receives the electronic correspondence to be monitored.

Overall, after the machine learning classifiers are built from the training dataset (as described under FIG. 1-3), new incoming email correspondences are automatically passed through each classifier that is implemented. In the system of FIG. 1, three classifiers 115, 120, and 125 are included. After analysis of a correspondence, each classifier classifies/labels each of the incoming correspondences either as litigious or non-litigious. In another embodiment, each classifier may also classify the risk of being litigious as low, medium, or high. The ensemble model 130 may also continuously learn from user-feedback that helps to validate results, which is then fed back into the system for retraining. A more detailed explanation follows.

With reference to FIG. 4, once the method 400 is initiated and functioning on a targeted computing platform, at block 410, network communications are monitored to identify electronic correspondence received by the computing platform. For example, emails or other electronic correspondence are identified by an associated email system upon which the present system operates.

At 420, the system detects and identifies the email and its associated construction project. As previously explained, the machine learning models 115, 120, and 125 have been trained to identify construction and engineering vocabulary and terminology. This type of identification may assist to filter out emails or email threads that are not related to construction projects.

As another example, an organization may have one or more ongoing construction projects where each has a defined name and/or other metadata stored in the system that identifies each project. The system may parse and scan text from a received email and identify any known words or phrases that match an existing project ID and metadata. If found, the received email is associated with the existing project. Other ways of identification may include having a project ID in an email.

Each incoming email correspondence further passes through a number of functions for programmatically cleaning the correspondence. For example, at block 430, each email may be cleaned by removal of all non-Latin alphabet characters, html tags, punctuations, numbers and stop words. The email text may be tokenized by identifying and breaking down the correspondence text into words, punctuation marks, numeric digits, other objects in the text, etc (block 430). If the email includes at least one word with greater than 4 letters, then each word in the email is stemmed to their root word.

At 440, the tokenized text words from the email are vectorized and feature scaled. In one embodiment, vectorizing the text includes converting each word into numbers, which are numeric vectors. Vectorization maps words or phrases from vocabulary to a corresponding vector of real numbers, which may be used to find word predications, word similarities and/or semantics. The vectors of numbers (i.e. features) are features and may be scaled by normalizing the range of features of data.

At 450, after cleaning the correspondence text and feature scaling, the ensemble machine learning classifier of FIG. 1 is initiated to identify construction terms and classify litigation risk of the correspondence. The correspondence text is passed through each of the three machine learning classifiers 115, 120, and 125 of the system 100 (FIG. 1). Each classifier makes an individual prediction of whether the email text is litigious or non-litigious based on the learned training data.

In one embodiment at block 460, the numeric vectors generated at block 440 are mapped to numeric vectors associated with the defined datasets of known litigious vocabulary and known non-litigious vocabulary (e.g., from the previously generated document term matrix (see Table 1). In other words, the machine learning classifier processes the numeric vectors generated from the email correspondence by at least matching and comparing the numeric vectors to known numeric vectors that were generated from a set of defined litigious vocabulary and a set of defined non-litigious vocabulary.

At block 470, each of the three classifiers 115, 120, and 125 independently evaluates the correspondence and generates a prediction of a probability risk value for the correspondence being evaluated as previously described above. If the probability risk value exceeds the defined threshold value set for the associated classifier, then that classifier labels the correspondence as litigious (e.g., a value of "1") or non-litigious (e.g., value of "0"). In general, the output label is viewed as a "vote" since the output is either a "1" (litigious YES) or "0" (litigious NO). The multiple "votes" generated by the multiple classifiers is then combined for a majority vote determination.

At block 480, the three labels/votes output by the three classifiers are then combined using the majority voting scheme (e.g., equation 2) as part of the ensemble model 130. Based on the combined labels, the email correspondence is given a final label by the system as litigious or non-litigious based on the majority voting of the individual votes of the three classifiers. In another embodiment, a different odd number amount of classifiers may be used or an even number of classifiers with one or more having their votes more weighted to avoid a tie in voting.

In other words, the ensemble classifier comprises an odd number of independent machine learning classifiers (three classifiers in the above example). Each of the independent machine learning classifiers generates an output that classifies the email correspondence as being litigious or non-litigious. The output from each of the independent machine learning classifiers are all combined based at least in part on the majority vote scheme to generate the final label for the email as being litigious or non-litigious.

At block 490, the system is configured to generate an electronic notice if and when the final label indicates that the correspondence is litigious. In one embodiment, the electronic notice includes data that identifies the correspondence, the associated construction project, and an alert message regarding the potential litigation risk. The electronic notice may also include additional data such as the email sender and receiver. The electronic notice may highlight or visually distinguish the text from the email correspondence related to litigious vocabulary as identified by the machine learning classifiers. The electronic notice is then transmitted to a remote device and/or displayed on a graphical user interface to allow a user to receive the notice and have access to the correspondence in near real time so that an action may be taken to address issues in the correspondence.

In another embodiment, the system transmits the electronic notice to a designated remote device (e.g., via address, cell phone number, or other device ID) including at least the identification of the email and the label that indicates the email as litigious or non-litigious. In response to receiving the electronic notice, the remote device provides a user interface that displays the data from the electronic notice and allows input to validate the label and change the label if a user believes the label is incorrect. This may include viewing any identified suspicious text from the email correspondence to allow the user to determine if the text is litigious or non-litigious. The user interface allows the label to be selected and changed. The system may then transmit the changed label and corresponding email as feedback to the machine learning classifier to retrain the machine learning classifier. The validation mechanism is further described in the following section.

Validation and Continuous Learning

With reference again to FIG. 1, in one embodiment, the correspondence text for one or more predictions made by the ensemble model 130 may be made available to a user of the system 100. This provides a validation mechanism so that the user is able to apply human decision making to validate the prediction and the associated label (litigious or non-litigious). As part of the validation mechanism, the system 100 provides a feedback user interface 150 that allows a user to input corrections to retag or otherwise re-label selected correspondence as litigious or not litigious in case the user does not agree with the predictions and labels made by the ensemble model 130.

A continuously learning process is implemented to retrain the ensemble model 130 with the new feedback data that changes previous labels. The ensemble model 130 receives the label changes and other feedback data as input to be combined and retrained with the existing training dataset of classified data (block 155). This feedback data 155 is used to re-train the ensemble model 130 with the previous and newly labeled correspondence bodies. The retrained ensemble model 130 will replace the existing model if the retrained model outperforms the existing model. This may be based on executing a number of comparison tests to determine the model's accuracy in predictions. Using this feedback mechanism, the risk detection system 100 will learn to classify correspondences more accurately over a period of time.

With the present system and method, email correspondence may be classified as litigious or not litigious in real time or near-real time. Such correspondences classified as litigious may indicate early signs of potential issues that could lead to larger disputes or litigation that could most likely have adverse or catastrophic impact on a project/asset under construction. Thus the present system enables an early action(s) to be taken to effectively mitigate this risk of litigation whenever it is proactively identified by the present system.

No action or function described or claimed herein is performed by the human mind. An interpretation that any action or function can be performed in the human mind is inconsistent and contrary to this disclosure.

Cloud or Enterprise Embodiments

In one embodiment, the risk detection system 100 is a computing/data processing system including an application or collection of distributed applications for enterprise organizations. The applications and risk detection system 100 may be configured to operate with or be implemented as a cloud-based networking system, a software as a service (SaaS) architecture, or other type of networked computing solution. In one embodiment the risk detection system is a centralized server-side application that provides at least the functions disclosed herein and that is accessed by many users via computing devices/terminals communicating with the risk detection system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 5:
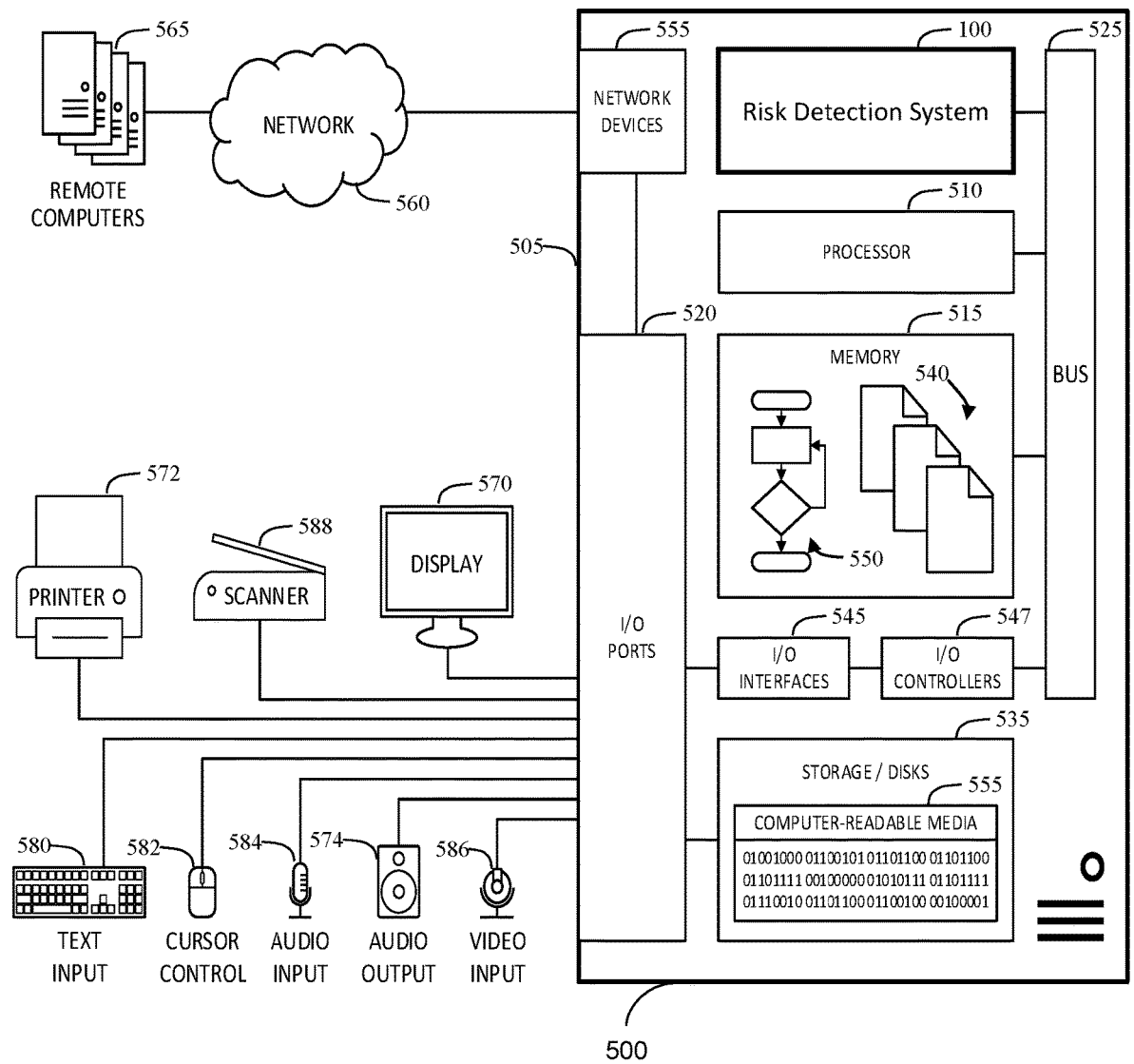
FIG. 5 illustrates an embodiment of a computing system configured with the example systems and/or methods disclosed.

In one embodiment, FIG. 5 illustrates a computing system 500 configured and/or programmed as a special purpose computing device with one or more components of the present risk prediction system 100 and methods described herein, and/or equivalents.

The example computing system 500 may be a computer 505 that includes a hardware processor 510, a memory 515, and input/output ports 520 operably connected by a bus 525. In one example, the computer 505 is configured with the risk prediction system 100 as shown and described with reference to FIGS. 1-4. In different examples, the risk prediction system 100 may be implemented in hardware, a non-transitory computer-readable medium with stored instructions, firmware, and/or combinations thereof.

In one embodiment, risk prediction system 100 and/or the computer 505 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The risk prediction system 100 may also be implemented as stored computer executable instructions that are presented to computer 505 as data 540 that are temporarily stored in memory 515 and then executed by processor 510.

Generally describing an example configuration of the computer 505, the processor 510 may be a variety of various processors including dual microprocessor and other multiprocessor architectures. A memory 515 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 535 may be operably connected to the computer 505 via, for example, an input/output (I/O) interface (e.g., card, device) 545 and an input/output port 1020. The disk 535 may be, for example, a magnetic disk drive, a solid-state disk drive, a floppy disk drive, a tape drive, a Zip drive, a flash memory card, a memory stick, and so on. Furthermore, the disk 535 may be a CD-ROM drive, a CD-R drive, a CD-RW drive, a DVD ROM, and so on. The memory 515 can store a process 550 and/or a data 540, for example. The disk 535 and/or the memory 515 can store an operating system that controls and allocates resources of the computer 505.

The computer 505 may interact with input/output (I/O) devices via the I/O interfaces 545 and the input/output ports 520. The communications between the processor 510 and the I/O interfaces 545 and ports 520 are managed by an input/output controller 547. The input/output ports 520 may include, for example, serial ports, parallel ports, and USB ports.

The computer 505 can operate in a network environment and thus may be connected to the network devices 555 via the I/O interfaces 545, and/or the I/O ports 520. Through the network devices 555, the computer 505 may interact with a network 560. Through the network 560, the computer 505 may be logically connected to remote computers 565. Networks with which the computer 505 may interact include, but are not limited to, a LAN, a WAN, and other networks.

The computer 505 can send and receive information and signals from one or more output devices or input devices through I/O ports 520. The output devices include one or more displays 570, printers 572 (such as inkjet, laser, or 3D printers), and audio output devices 574 (such as speakers or headphones). The input devices include one or more text input devices 580 (such as keyboards), cursor controllers 582 (such as mice, touchpads, or touch screens), audio input devices 584 (such as microphones), video input devices 586 (such as video and still cameras), or other input devices, such as scanner 588. Input/output devices may further include the disk 535, the network devices 555, and so on. In some cases, the computer 505 can be controlled by information or signals generated or provided by input or output devices, such as by text input devices 580, cursor controllers 582, audio input devices 584, disk 535, and network devices 555.

Definitions and Other Embodiments

In another embodiment, the described methods and/or their equivalents may be implemented with computer executable instructions in a form of an executable application (stand-alone application or part of a bigger system). Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method performed by at least one computing device, the method comprising:
   training a machine learning classifier to identify litigious vocabulary based at least in part on (i) a first dataset of email correspondences having known construction terminology and known litigious vocabulary and (ii) a second dataset of email correspondences having known construction terminology and known non-litigious vocabulary;
   wherein the machine learning classifier includes an ensemble classifier comprising an odd number of independent machine learning classifiers;
   monitoring email communications over a network to identify an email transmitted;
   in response to receiving the email over the network, detecting and identifying the email as being associated with a construction project by the machine learning classifier based on the known construction terminology;
   tokenizing text from the email into a plurality of words;
   vectorizing each of the plurality of words into a numeric vector that maps each word to a numeric value;
   applying the machine learning classifier to classify text with a risk as being litigious or non-litigious, and input the numeric vectors generated from the email into the machine learning classifier;
   wherein the machine learning classifier processes the numeric vectors from the email by at least corresponding the numeric vectors to a set of the known litigious vocabulary and the known non-litigious vocabulary;
   generating a probability value that the email is litigious;
   labeling the email as litigious or non-litigious based at least in part on the probability value that the email is litigious; and
   generating and transmitting an electronic notice to a remote device in response to the email being labeled as being litigious to provide an alert.

2. The method of claim 1,
   wherein each of the independent machine learning classifiers are configured to identify construction terminology;
   generating an output by each of the independent machine learning classifiers that classifies the email as being litigious or non-litigious; and
   combining the output from each of the independent machine learning classifiers based at least in part on a majority vote to generate the label for the email as being litigious or non-litigious.

3. The method of claim 1 further comprising:
   initiating, as part of the independent machine learning classifiers, a second machine learning classifier and a third machine learning classifier both configured to identify construction terminology and to classify text with a prediction as being litigious or non-litigious, where each machine learning classifier is implemented with a different theoretical background from each other to avoid bias and redundancy during classification;
   generating an individual prediction by each of the machine learning classifiers indicating whether the email is litigious or non-litigious to produce at least three individual predictions; and
   labelling the email as litigious or non-litigious based on a majority vote of the three individual predictions.

4. The method of claim 1, further comprising:
   generating the electronic notice to include identification of the email and the label that indicates the email as litigious or non-litigious;

providing a user interface to allow input to validate the label and change the label; and feeding back the changed label and corresponding email to the machine learning classifier to retrain the machine learning classifier.

5. The method of claim 1 further comprising:

inputting the construction terminology to the machine learning classifier from a glossary or database of construction project terms.

6. The method of claim 1, wherein:

detecting and identify the email as being associated with the construction project by at least evaluating the text from the email in relation to the trained dataset of construction terminology implemented by the machine learning classifier.

7. A non-transitory computer-readable medium that includes stored thereon computer-executable instructions that when executed by at least a processor of a computer cause the computer to:

train a machine learning classifier to identify litigious vocabulary based at least in part on (i) a first dataset of email correspondences having known construction terminology and known litigious vocabulary and (ii) a second dataset of email correspondences having known construction terminology and known non-litigious vocabulary;

wherein the machine learning classifier includes an ensemble classifier comprising an odd number of independent machine learning classifiers;

monitor email communications over a network to identify an email transmitted;

in response to receiving the email over the network, detect and identify the email as being associated with a construction project by the machine learning classifier based on the known construction terminology;

tokenize text from the email into a plurality of words;

applying the machine learning classifier to classify text with a risk as being litigious or non-litigious;

input the plurality of words generated from the email into the machine learning classifier;

wherein the machine learning classifier processes the plurality of words from the email by at least corresponding the plurality of words to the known litigious vocabulary and the known non-litigious vocabulary;

generate a probability value that the email is litigious;

label the email as litigious or non-litigious based at least in part on the probability value that the email is litigious; and generate and transmit an electronic notice to a remote device in response to the email being labeled as being litigious to provide an alert in near-real time in relation to receiving the email over the network.

8. The non-transitory computer-readable medium of claim 7, wherein each of the independent machine learning classifiers are configured to identify construction terminology;

wherein each of the independent machine learning classifiers generate an output that classifies the email as being litigious or non-litigious; and wherein the output from each of the independent machine learning classifiers is combined based at least in part on a majority vote to generate the label for the email as being litigious or non-litigious.

9. The non-transitory computer-readable medium of claim 7, further comprising instructions that when executed by at least the processor cause the processor to:

initiate, as part of the independent machine learning classifiers, a second machine learning classifier and a third machine learning classifier both configured to identify construction terminology and to classify text with a prediction as being litigious or non-litigious, where each machine learning classifier is implemented with a different theoretical background from each other to avoid bias and redundancy during classifications;

where each of the machine learning classifiers generates an individual prediction of whether the email is litigious or non-litigious to produce at least three individual predictions; and labelling the email litigious or non-litigious based on a majority vote of the three individual predictions.

10. The non-transitory computer-readable medium of claim 7, further comprising instructions that when executed by at least the processor cause the processor to:

transmit the electronic notice to the remote device including identification of the email and the label that indicates the email as litigious or non-litigious;

provide a user interface to allow input to validate the label and change the label; and feeding back the changed label and corresponding email to the machine learning classifier to retrain the machine learning classifier.

11. The non-transitory computer-readable medium of claim 7, further comprising instructions that when executed by at least the processor cause the processor to:

input the construction terminology to the machine learning classifier from a glossary or database of construction project terms.

12. The non-transitory computer-readable medium of claim 7, further comprising instructions that when executed by at least the processor cause the processor to:

train the machine learning classifier to identify litigious text with a first dataset of correspondences having known litigious text and a second dataset of correspondences having known non-litigious text.

13. The non-transitory computer-readable medium of claim 7, further comprising instructions that when executed by at least the processor cause the processor to:

detect and identify the email as being associated with the construction project by at least evaluating the text from the email in relation to a trained dataset of construction terminology implemented by the machine learning classifier.

14. A computing system, comprising:

at least one processor configured to execute instructions;

at least one memory operably connected to the at least one processor;

a machine learning classifier configured to identify construction terminology and to classify text with a risk as being litigious or non-litigious;

a non-transitory computer-readable medium that includes stored thereon computer-executable instructions that when executed by the at least one processor causes the computing system to:

train a machine learning classifier to identify litigious vocabulary based at least in part on (i) a first dataset of email correspondences having known construction terminology and known litigious vocabulary and (ii) a second dataset of email correspondences having known construction terminology and known non-litigious vocabulary;

wherein the machine learning classifier includes an ensemble classifier comprising an odd number of independent machine learning classifiers;

monitor email communications over a network to identify an email transmitted;

in response to receiving the email over the network, detect and identify the email as being associated with a construction project by the machine learning classifier based on the known construction terminology;

tokenize text from the email into a plurality of words;

input the plurality of words generated from the email into the machine learning classifier;

wherein the machine learning classifier is configured to evaluate the plurality of words from the email by at least corresponding the plurality of words to the known litigious vocabulary and the known non-litigious vocabulary;

generate, by the machine learning classifier, a probability value that the email is litigious;

label the email as litigious or non-litigious based at least in part on the probability value that the email is litigious; and generate and transmit an electronic notice to a remote device in response to the email being labeled as being litigious to provide an alert in near-real time in relation to receiving the email over the network.

15. The computing system of claim 14, wherein each of the independent machine learning classifiers is configured to identify construction terminology;

wherein each of the independent machine learning classifiers is configured to generate an output that classifies the email as being litigious or non-litigious; and wherein ensemble classifier is configured to combine the output from each of the independent machine learning classifiers based at least in part on a majority vote to generate the label for the email as being litigious or non-litigious.

16. The computing system of claim 14, wherein machine learning classifier includes at least a first machine learning classifier, a second machine learning classifier and a third machine learning classifier;

wherein each of the machine learning classifiers are configured to identify construction terminology and to classify text with a prediction as being litigious or non-litigious;

where each machine learning classifier is implemented with a different theoretical background from each other to avoid bias and redundancy during classification, where each of the machine learning classifiers is configured to generate an individual prediction of whether the email is litigious or non-litigious to produce at least three individual predictions; and wherein the computing system is configured to label the email as litigious or non-litigious based on a majority vote of the three individual predictions.

17. The computing system of claim 14, further comprising instructions that when executed by the at least one the processor cause the processor to:

transmit the electronic notice to the remote device including identification of the email and the label that indicates the email as litigious or non-litigious;

provide a user interface to allow input to validate the label and change the label; and feeding back the changed label and corresponding email to the machine learning classifier to retrain the machine learning classifier.

18. The computing system of claim 14, further comprising instructions that when executed by the at least one the processor cause the processor to:

input the construction terminology to the machine learning classifier from a glossary or database of construction project terms.

* * * * *

UNITED STATES PATENT AND TRADEMARK OFFICE
CERTIFICATE OF CORRECTION

| | | |
|---|---|---|
| PATENT NO. | : 11,481,734 B2 | Page 1 of 1 |
| APPLICATION NO. | : 17/018297 | |
| DATED | : October 25, 2022 | |
| INVENTOR(S) | : Venkatasubramanian et al. | |

It is certified that error appears in the above-identified patent and that said Letters Patent is hereby corrected as shown below:

On the Title Page

On page 2, Column 1, under Item (56) Other Publications, Line 6, delete "Contruction" and insert -- Construction --, therefor.

On page 2, Column 2, under Item (56) Other Publications, Line 20, delete "'xgboosf';" and insert -- 'xgboost'; --, therefor.

In the Specification

In Column 1, Line 10, delete "62/900,086filed" and insert -- 62/900,086 filed --, therefor.

In Column 6, Line 38, delete "92" and insert -- 92. --, therefor.

In Column 9, Line 26, delete "FIG." and insert -- FIGS. --, therefor.

In Column 14, Line 13, delete "U.S.C" and insert -- U.S.C. --, therefor.

In Column 14, Line 63, delete "U.S.C" and insert -- U.S.C. --, therefor.

In the Claims

In Column 16, Line 29, in Claim 1, after "to" delete "a set of", therefor.

Signed and Sealed this
Eleventh Day of July, 2023

Katherine Kelly Vidal
*Director of the United States Patent and Trademark Office*